United States Patent
Todo et al.

(10) Patent No.: US 10,573,127 B2
(45) Date of Patent: Feb. 25, 2020

(54) INFORMATION PROCESSING SYSTEM, AND STORAGE MEDIUM HAVING STORED THEREIN INFORMATION PROCESSING PROGRAM

(71) Applicants: Yumi Todo, Tokyo (JP); Hiroshi Onishi, Tokyo (JP)

(72) Inventors: Yumi Todo, Tokyo (JP); Hiroshi Onishi, Tokyo (JP)

(73) Assignees: NINTENDO CO., LTD., Kyoto (JP); HAL LABORATORY, INC., Tokyo (JP)

( * ) Notice: Subject to any disclaimer, the term of this patent is extended or adjusted under 35 U.S.C. 154(b) by 0 days.

(21) Appl. No.: 15/805,497

(22) Filed: Nov. 7, 2017

(65) Prior Publication Data

US 2018/0130297 A1 May 10, 2018

(30) Foreign Application Priority Data

Nov. 10, 2016 (JP) .................................. 2016-219488

(51) Int. Cl.
| | |
|---|---|
| *G07F 17/32* | (2006.01) |
| *G06Q 20/40* | (2012.01) |
| *G06Q 30/02* | (2012.01) |
| *G06Q 20/38* | (2012.01) |
| *G06Q 20/12* | (2012.01) |

(52) U.S. Cl.
CPC ....... *G07F 17/3244* (2013.01); *G06Q 20/123* (2013.01); *G06Q 20/387* (2013.01); *G06Q 20/405* (2013.01); *G06Q 30/0209* (2013.01); *G07F 17/326* (2013.01); *G07F 17/3225* (2013.01)

(58) Field of Classification Search
CPC . G07F 17/3244; G07F 17/3225; G07F 17/326
See application file for complete search history.

(56) References Cited

U.S. PATENT DOCUMENTS

2009/0247282 A1* 10/2009 Cheng ..................... A63F 13/12
463/25

FOREIGN PATENT DOCUMENTS

JP          2015-188650          11/2015

* cited by examiner

*Primary Examiner* — Kevin Y Kim
(74) *Attorney, Agent, or Firm* — Nixon & Vanderhye P.C.

(57) ABSTRACT

A first virtual item is provided to a user in response to purchase made by the user. A second virtual item is provided to the user free of charge according to a certain provision rule. The provision rule is changed according to purchase information related to the first virtual item.

15 Claims, 9 Drawing Sheets

FIG. 5

| GROWTH LEVEL | LEVEL 1 | LEVEL 2 | LEVEL 3 | LEVEL 4 | LEVEL 5 | LEVEL 6 |
|---|---|---|---|---|---|---|
| TREE DISPLAY FORM | | | | | | |
| NUMBER OF HARVESTABLE APPLES | 5 | 8 | 14 | 20 | 30 | 450 |
| TOTAL AMOUNT OF PAYMENT FOR PURCHASE | ¥0 | ¥50 | ¥400 | ¥1000 | ¥1700 | ¥3000 |
| TOTAL NUMBER OF PURCHASED APPLES | 0 | 45 | 370 | 930 | 1650 | 2950 |

INFORMATION PROCESSING SYSTEM, AND STORAGE MEDIUM HAVING STORED THEREIN INFORMATION PROCESSING PROGRAM

CROSS REFERENCE TO RELATED APPLICATION

The disclosure of Japanese Patent Application No. 2016-219488, filed Nov. 10, 2016, is incorporated herein by reference.

FIELD

The technology disclosed herein relates to information processing systems, and storage medium having stored therein an information processing program, and more particularly, to an information processing system, and a storage medium having stored therein an information processing program, that perform a process based on a user's purchase operation, for example.

BACKGROUND AND SUMMARY

There is a conventionally known arrangement that gives a user in-game money which can be used in a virtual world, such as a game space or the like. For example, there is a known server that gives a user of a terminal apparatus a bonus depending on the degree of progress of a game.

On the other hand, a system for a game or the like in which paid items are purchased typically has a problem that the amount of payment for the paid items is likely to be excessive, and therefore, a user has difficulty in starting to purchase paid items with an easy mind. However, such a problem is not particularly taken into consideration in the above technology. Although the above server increases and decreases a bonus according to the degree of progress of a game or the frequency of play by a user of a terminal apparatus, the bonus has nothing to do with the purchase of paid items by the user.

With this in mind, it is a feature of this non-limiting example to provide an information processing system and a storage medium having stored therein an information processing program that can either encourage or restrain a user's purchase by associating the user's purchase with a bonus. It is another feature of this non-limiting example to provide an information processing system and a storage medium having stored therein an information processing program that allow a user to purchase with an easy mind.

To achieve the above, this non-limiting example has the following features, for example. It should be understood that the scope of the present technology is defined only by the appended claims. To the extent of any inconsistency or conflict in disclosure between the description and the claims appended hereto, the claims shall prevail.

An information processing system according to a non-limiting example configuration of this non-limiting example performs a predetermined information process based on a user's operation. The information processing system includes at least one computer configured to provide a first virtual item to the user in response to purchase made by the user, provide a second virtual item to the user free of charge according to a certain provision rule, and change the provision rule according to purchase information related to the first virtual item.

According to the above, when the user has made purchase to acquire the first virtual item, the provision rule for providing the second virtual item free of charge is changed. Therefore, the user's purchase can be either encouraged or restrained.

The first virtual item and the second virtual item may be the same type.

According to the above, when the user has made purchase to acquire the first virtual item, the provision rule for providing the virtual item of the same type free of charge is changed. Therefore, purchase by the user who desires to acquire the virtual item can be restrained.

The first virtual item and the second virtual item may be respectively any of virtual money, an in-game item, a virtual object, and an electronic coupon.

According to the above, when the user has made purchase to acquire any one of virtual money, an in-game item, a virtual object, and an electronic coupon, the provision rule for providing the virtual item of the same type free of charge is changed. Therefore, purchase by the user who desires to acquire the virtual item can be restrained.

The purchase information may be related to at least one of a type, amount, purchase amount, frequency of purchase, purchase period, number of times of purchase, and purchase time of the first virtual item provided.

According to the above, the provision rule for providing the virtual item free of charge can be changed according to the type, amount, purchase amount, frequency of purchase, purchase period, number of times of purchase, and purchase time of the first virtual item purchased. Therefore, the provision rule can be set according to various purchase situations.

The purchase information may be related to at least one of an amount, purchase amount, frequency of purchase, purchase period, and number of times of purchase of the first virtual item provided. In this case, the at least one computer may be configured to, in changing the provision rule, change the provision rule provided that the purchase information reaches at least one threshold.

According to the above, the provision rule can be changed in a stepwise manner according to a purchase situation.

The at least one computer may be configured to, in changing the provision rule, unless the purchase information reaches a new threshold, maintain the provision rule currently set without setting back to the previous provision rule, and change the provision rule currently set provided that the purchase information reaches the new threshold.

According to the above, as long as purchase for acquiring the first virtual item is not newly made, the provision rule is not changed. Therefore, the user can easily maintain the provision rule that has been once set.

The provision rule may be a combination of a condition for providing the second virtual item to the user, and an amount, value, or type of the second virtual item provided to the user. In this case, the at least one computer may be configured to, in changing the provision rule, set the provision rule provided that at least one of the condition, the amount, the value, and the type is changed according to the purchase information.

According to the above, a condition for providing the second virtual item to the user free of charge, and an amount, value, or type of the second virtual item provided to the user, can be changed according to a purchase situation.

The at least one computer may be configured to, in providing the second virtual item, provide the user with the second virtual item in an unusable mode insofar as a condition for providing the second virtual item to the user is unsatisfied, and change the second virtual item into a usable mode provided that the condition is satisfied after the provision.

According to the above, the user can recognize details of the second virtual item that is expected to be provided.

The information processing system may include a server, and a client apparatus configured to connect to the server. The server may include at least a computer configured to set the purchase information according to the user's purchase operation. The client apparatus may include at least a computer configured to provide the second virtual item.

According to the above, the client apparatus provides the second virtual item to the user without connected to the server.

The at least one computer may be configured to notify the user of a purchase requirement related to purchase or provision of the first virtual item, the purchase requirement being used to change the provision rule.

According to the above, the user can recognize what kind of purchase should be made in order to change the provision rule for the second virtual item.

The at least one computer may be configured to, in providing the second virtual item, provide the second virtual item to the user provided that a predetermined operation is performed, and in notifying, notify the user of the purchase requirement provided that the operation is performed.

According to the above, when the user has performed an operation for receiving the second virtual item, the user is notified of information for changing the provision rule for the second virtual item. Therefore, the user who desires to receive the second virtual item can be reliably notified of the information.

The at least one computer may be configured to, in changing the provision rule, change and set the provision rule so that an amount of the second virtual item provided to the user is increased by an increment greater than the previous one each time the second virtual item is provided to the user.

According to the above, the amount of the second virtual item that is provided free of charge in response to purchase increases at an accelerating pace. Therefore, the amount of the second virtual item provided easily reaches a necessary and sufficient amount. As a result, the purchase amount can be restrained.

The at least one computer may be configured to, in providing the first virtual item, set an upper limit on the user's purchase of the first virtual item.

According to the above, the purchase of the first virtual item is limited. Therefore, the purchase amount can be restrained.

An information processing system according to another non-limiting example configuration of this non-limiting example performs a predetermined information process based on a user's operation. The information processing system includes at least one computer configured to process purchase made by the user, obtain purchase information related to the purchase made by the user, provide a predetermined bonus to the user according to a predetermined free bonus provision rule, and change the free bonus provision rule according to the purchase information.

When the user has made purchase, the provision rule for providing the bonus free of charge is changed. Therefore, the user's purchase can be either encouraged or restrained.

This non-limiting example may be implemented in the form of an information processing apparatus included in the above information processing system, or a storage medium having stored therein an information processing program executable by a computer included in the information processing apparatus.

According to this non-limiting example, when the user has made purchase to acquire the first virtual item, or purchases a commercial product or service, etc., the provision rule for providing the second virtual item or the bonus free of charge is changed. Therefore, the user's purchase can be either encouraged or restrained.

These and other features, aspects, and advantages of the present exemplary embodiment will become more apparent from the following detailed description of the present exemplary embodiment when taken in conjunction with the accompanying drawings.

BRIEF DESCRIPTION OF THE DRAWINGS

FIG. 5 shows non-limiting example growth table data that indicates a relationship between growth levels of a tree which produces apples (virtual money), and details of purchase made by a user.

DETAILED DESCRIPTION OF NON-LIMITING EXAMPLE EMBODIMENTS

Figure 1:
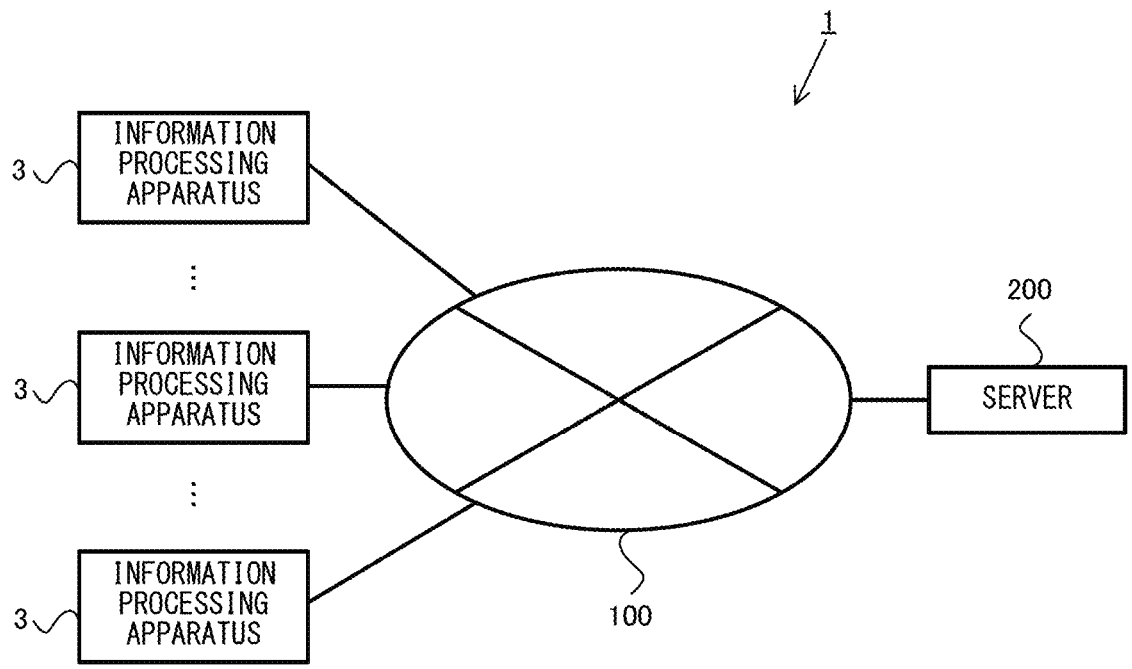
FIG. 1 shows a non-limiting example information processing system according to this non-limiting example.

An information processing system according to this non-limiting example will be described FIG. 1. As shown in FIG. 1, an information processing system 1 that is a non-limiting example of this information processing system includes one or more information processing apparatuses 3 and a server 200, which are connected together through a network 100.

The information processing apparatuses 3, which are configured to be able to connect to the network 100 through wireless or wired communication, and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card, an optical disc, or the like, or received from another apparatus. The information processing apparatuses 3 may be a typical personal computer, stationary game machine, mobile telephone, handheld game console, personal digital assistant (PDA), or the like.

Figure 2:
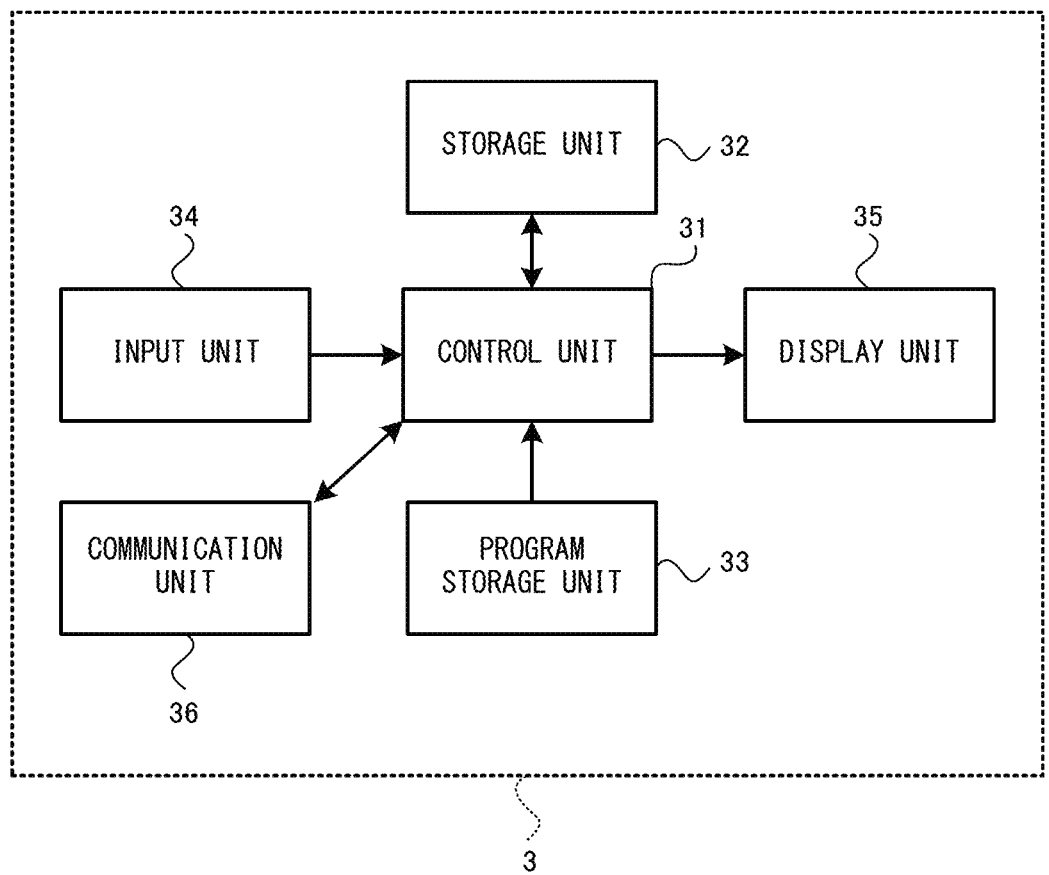
FIG. 2 shows a non-limiting example configuration of an information processing apparatus 3 shown in FIG. 1.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, and a communication unit 36. It should be noted that the information processing apparatus 3 may include one or more devices including an information processing device including at least the control unit 31, and other devices.

The control unit 31 is an information processing means (computer) for executing various information processes, such as a CPU or the like. For example, the control unit 31 has a function of executing the above applications as information processes to perform a game process described below, data transmission and reception processes through the server 200, and the like. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with suitable timing.

The input unit 34 is an input device that can be operated by a user. The input unit 34 may be any suitable input device.

The display unit 35 displays an image according to an instruction from the control unit 31. It should be noted that when the information processing apparatus 3 is a stationary game apparatus or a personal computer, the display unit 35 may be separated from the information processing apparatus 3.

The communication unit 36, which is a predetermined communication module, exchanges data with another apparatus (e.g., the server 200) or another information processing apparatus 3 through the network 100.

Figure 3:
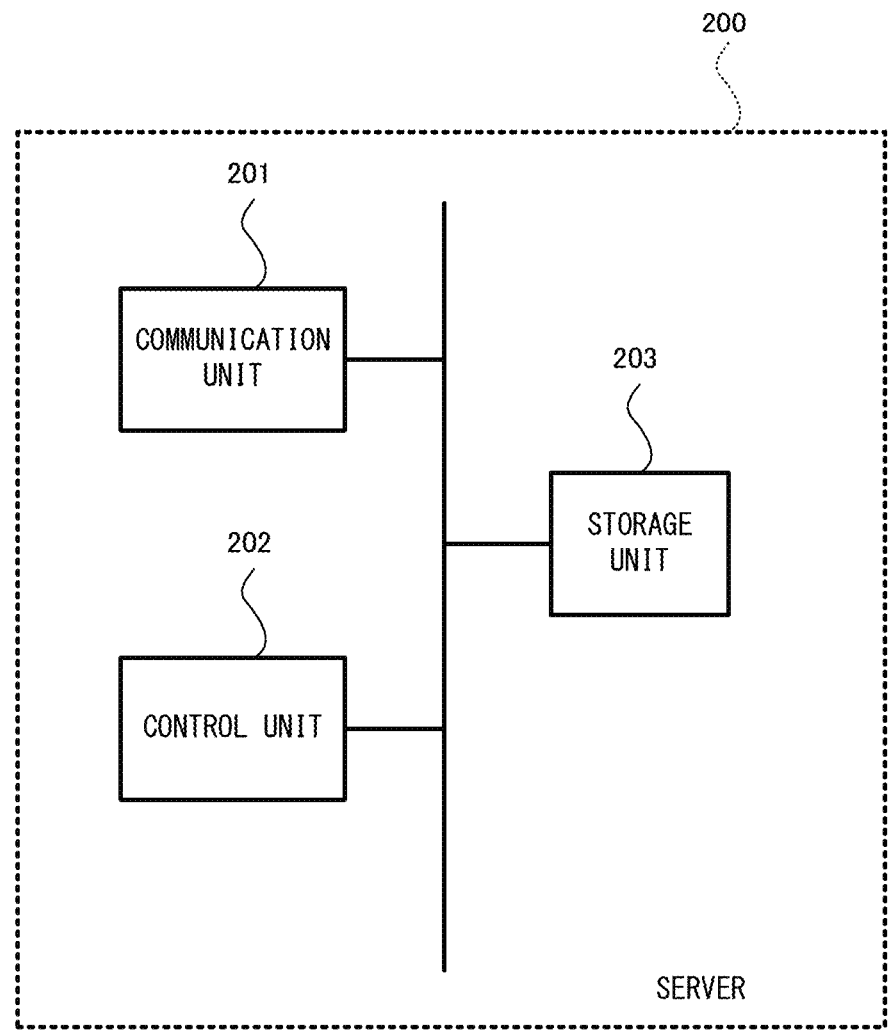
FIG. 3 shows a non-limiting example configuration of a server 200 shown in FIG. 1.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. The control unit 202 performs a process of managing information related to purchase in response to a user's purchase operation, and a process of managing virtual item purchase data received from the information processing apparatuses 3. In addition, the control unit 202 establishes a communication link with the information processing apparatuses 3, etc., through the communication unit 201, and performs data transfer control and path selection on the network 100. Here, purchase-related information managed by the server 200 includes at least various items of information that are used when a user additionally purchases a virtual item (including virtual money, such as in-game money and the like), such as details of purchase made by a user for a game, the balance of cash or the balance of points after a user's payment settlement, and the like. The storage unit 203 stores programs that are executed by the control unit 202, various items of data used for the above processes, various items of data used for communication with the information processing apparatuses 3, and the like. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
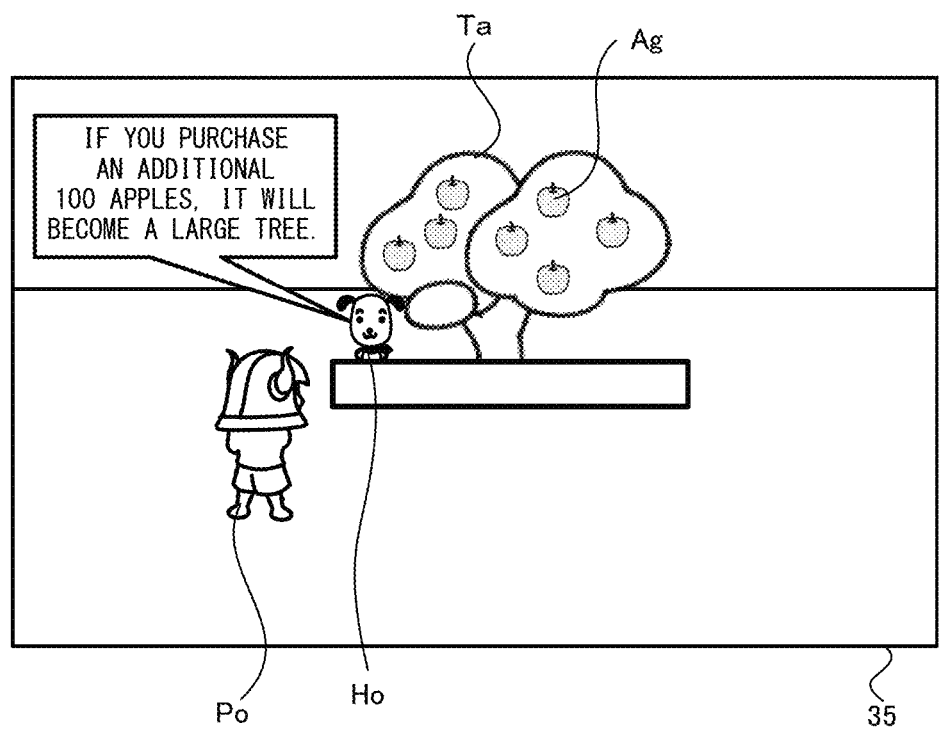
FIG. 4 shows a first non-limiting example game image displayed on a display unit 35 of the information processing apparatus 3.
Figure 6:
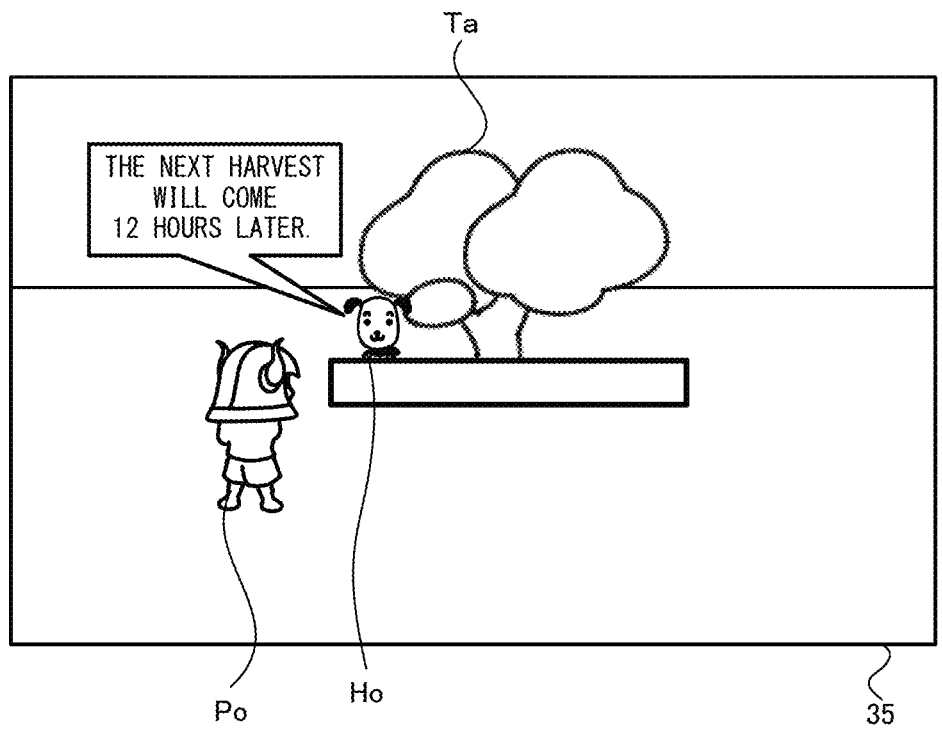
FIG. 6 shows a second non-limiting example game image that is displayed on the display unit 35 of the information processing apparatus 3.
Figure 7:
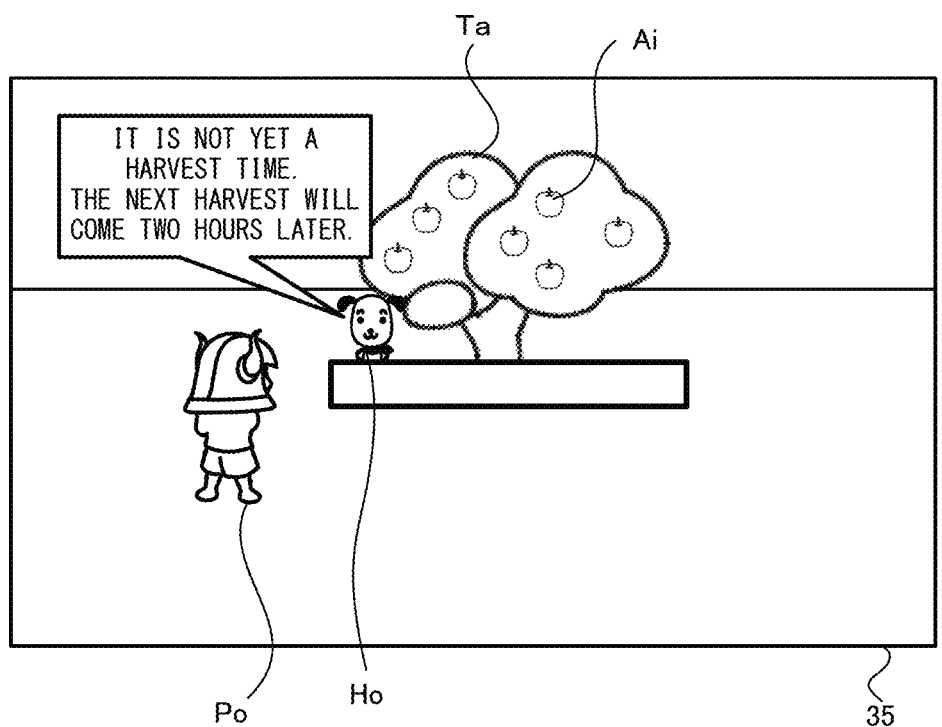
FIG. 7 shows a third non-limiting example game image that is displayed on the display unit 35 of the information processing apparatus 3.

Next, before describing specific processes performed by the information processing apparatuses 3 and the server 200, processes performed in the information processing system 1 will be outlined with reference to FIGS. 4-7. FIG. 4 is a diagram showing a first non-limiting example game image that is displayed on the display unit 35 of the information processing apparatus 3. FIG. 5 is a diagram showing non-limiting example growth table data that indicates a relationship between growth levels of a tree which produces apples (virtual money) which are a non-limiting example virtual item, and details of purchase made by a user. FIG. 6 is a diagram showing a second non-limiting example game image that is displayed on the display unit 35 of the information processing apparatus 3. FIG. 7 is a diagram showing a third non-limiting example game image that is displayed on the display unit 35 of the information processing apparatus 3. In the description that follows, employed is a game as a non-limiting example application that is executed by the information processing apparatus 3. Alternatively, other applications may be executed in the information processing apparatuses 3.

In FIG. 4, the display unit 35 of the information processing apparatus 3 is displaying a game image corresponding to a game that is being played by the information processing apparatus 3, particularly showing a non-limiting example scene of the game in which a player object Po has a conversation with a companion object Ho. For example, the companion object Ho is present in a virtual world near a tree Ta. Here, the tree Ta is a virtual object that produces apples Ag. In the non-limiting example of FIG. 4, shown is a situation in which there are harvestable apples Ag on the tree Ta. Apples Ag are used as virtual money in the virtual world in which the player object Po is present. For example, apples Ag can be used to purchase various objects (e.g., tools, weapons, clothes, foods, vehicles, jewelry, etc.) that are used in the virtual world, and acquire abilities (e.g., experience points, a fight parameter, a defense parameter, a movement speed parameter, a life parameter, etc.) for the player object Po. Therefore, if the player object Po is successful in acquiring apples Ag on the tree Ta, the user can use the apples Ag as a beneficial virtual item (reward) in the virtual world.

The user can cause the player object Po to approach the tree Ta in the virtual world, by performing a predetermined operation on the input unit 34. When the player object Po is near the tree Ta, the user can harvest all apples Ag on the tree Ta by performing a predetermined operation on the input unit 34.

In this non-limiting example game, the next harvest of apples Ag on the tree Ta comes after a predetermined period of time (e.g., 12 hours) has elapsed since the previous harvesting. In other words, when the player object Po harvests apples Ag, the next harvest will come 12 hours or more after that harvesting. The number of apples A on the tree Ta varies depending on the growth level of the tree Ta. For example, as shown in FIG. 5, the number of harvestable apples A increases with an increase in the growth level of the tree Ta, like 5, 8, 14, 20, 30, and 450 apples in order of the growth level of the tree Ta with the lowest first. Therefore, in the virtual world, the number of harvestable apples Ag (virtual money) increases as the tree Ta grows, and the user can improve the player object Po's performance by growing the tree Ta.

In this non-limiting example game, a user can acquire apples Ag (virtual money) harvested from the tree Ta free of charge. Therefore, a user can increase virtual money that can be acquired free of charge, by growing the tree Ta. As used herein, the term "free of charge" refers to a situation in which apples Ag, which are virtual money, can be acquired without additional purchase. Thus, even when a user has to pay to use software for the game, or a user has to play the game itself, or a user has to play to perform a predetermined operation in the game, etc., then if a user can acquire apples Ag without additional purchase, it can be considered that apples Ag can be acquired free of charge. As will be seen below, in order to purchase apples Ag using money that is used in the real world (also referred to as "real money"), a user accesses the server 200, which manages purchase-related information, etc. Meanwhile, when apples Ag harvested from the tree Ta are acquired free of charge, the information processing apparatus 3 does not access the server 200. In other words, apples Ag, which are a second virtual item, can be given free of charge using data stored in the information processing apparatus 3.

In this non-limiting example game, apples Ag, which are virtual money, can be purchased by a user using real money. For example, when a user performs a process of purchasing apples Ag in real money using the information processing apparatus 3, information related to payment for the purchase is sent to the server 200, in which a predetermined authentication process is then performed, and thereafter, settlement is made between the server 200 and the user. Thereafter, when the information processing apparatus 3 is notified by the server 200 that payment for the purchase of apples Ag has been settled, the information processing apparatus 3 adds the purchased apples Ag so that the player object Po possesses these apples Ag. As used herein, the term "purchase" refers to a situation in which apples Ag, which are virtual money, can be acquired by paying real money. Specifically, when a user has to pay to use software for the game, or a user has to play the game itself, or a user has to play to perform a predetermined operation in the game, etc., then if the user acquires apples Ag by paying rea money, it can be considered that the user acquires the apples Ag by purchase. Needless to say, when software for performing the game is free, or playing the game itself is free, or a predetermined operation in the game is free, etc., then if the user acquires apples Ag by paying real money, it can be considered that the user acquires the apples Ag by purchase. The above purchase using real money may be settled by a means that has been previously purchased by a user, or delayed payment. For example, virtual money may be purchased using a prepaid card previously purchased by a user, or a credit card, which a user uses to pay later.

In this non-limiting example game, the growth level of the tree Ta increases according to the total number of purchased apples Ag or the total amount of payment for purchased apples Ag, which are a non-limiting example piece of purchase information. For example, as shown in FIG. 5, when the total number of purchased apples Ag has reached 45, i.e., the total amount of payment for purchased apples A has reached 50 yen, the growth level of the tree Ta increases from level 1 (the lowest growth level) to level 2, which causes the number of harvestable apples A to increase from 5 to 8. When the total number of purchased apples Ag has reached 370, i.e., the total amount of payment for purchased apples A has reached 400 yen, the growth level of the tree Ta increases from level 2 to level 3, which causes the number of harvestable apples A to increase from 8 to 14. When the total number of purchased apples Ag has reached 930, i.e., the total amount of payment for purchased apples A has reached 1,000 yen, the growth level of the tree Ta increases from level 3 to level 4, which causes the number of harvestable apples A to increase from 14 to 20. When the total number of purchased apples Ag has reached 1,650, i.e., the total amount of payment for purchased apples A has reached 1,700 yen, the growth level of the tree Ta increases from level 4 to level 5, which causes the number of harvestable apples A to increase from 20 to 30. When the total number of purchased apples Ag has reached 2,950, i.e., the total amount of payment for purchased apples A has reached 3,000 yen, the growth level of the tree Ta increases from level 5 to level 6 (the highest growth level), which causes the number of harvestable apples A to increase from 30 to 450.

Thus, when apples Ag, which are in-game money (virtual money), have been purchased, the number of apples Ag that can be regularly harvested after that purchase increases. Therefore, not only acquired is in-game money by purchase, but also the amount of in-game money that is regularly given can be increased. Therefore, a user's purchase can be either encouraged or restrained. In addition, a user is allowed to be aware of the level of advantage of purchase each time the user regularly acquires in-game money free of charge.

It should be noted that an increase in the growth level of the tree Ta, i.e., a change in a free bonus, is typically performed according to the total number of purchased apples Ag or the total amount of payment for purchased apples Ag, for a user who has purchased the apples Ag. In other words, it is a user who purchases apples Ag that acquires a bonus that the growth level of the tree Ta is increased and the number of apples Ag that can be regularly harvested is thereby increased. For example, even when the tree Ta grown by a user who has purchased its apples Ag is accessible to player objects operated by other users, a player object operated by that user may be the only one that is allowed to harvest apples Ag from that tree Ta.

In the above non-limiting example, when apples Ag, which are in-game money, have been purchased, the number of apples Ag that are regularly acquired from the tree Ta after the purchase (these apples Ag each have the same in-game money value that of those purchased before) increases. Alternatively, another form of benefit may be obtained from purchase. In a first non-limiting example, when apples Ag, which are in-game money, have been purchased, apples Ag may be acquired after the purchase at shorter time intervals. In a second non-limiting example, when apples Ag, which are in-game money, have been acquired by dealing successfully with a predetermined event (e.g., winning a fight with an opponent object, fulfilling a predetermined quest or mission, etc.), the number of apples Ag that are acquired by dealing successfully with that event may be changed and increased by purchasing apples Ag. In a third non-limiting example, when apples Ag, which are in-game money, have been purchased, the amount of another virtual item that has a value different from that of apples Ag in the virtual world (e.g.: another type of in-game money that has a relatively higher value that is equivalent to a predetermined number of apples Ag; an ability-improving item, a privilege to participate in an event, a coupon, etc., that are used for purposes different from that of in-game money; etc.), which is regularly supplied, may be increased.

In this non-limiting example game, there is an upper limit (the highest growth level) on the growth level of the tree Ta, and there is also an upper limit on the number of harvestable apples Ag. The number of harvestable apples Ag at the highest growth level is set to considerably high compared to the other levels, which is sufficient for the player object Po to perform activities in the virtual world. There is also an upper limit on the total number of apples Ag that can be purchased using real money (the total amount of payment for apples A). This upper limit corresponds to the total number of apples Ag purchased for growing the tree Ta to the highest growth level. The growth level of the tree Ta may be designed to increase to the next level in response to purchase, and not decrease to a lower level. In this case, the tree Ta that has grown to the highest growth level can continue to provide harvestable apples A the number of which corresponds to the highest growth level, during the subsequent course of the game. Therefore, a user does not conceive of purchasing beyond the upper limit of the purchase amount, and cannot purchase beyond the upper limit of the purchase amount, and therefore, can be substantially prevented from purchasing more than necessary. It should be noted that, in this non-limiting example game, the effect of restraining purchase can be achieved by at least either enabling a user to acquire a considerably large number of apples Ag at the upper limit of the growth level of the tree Ta or setting an upper limit on the total number of apples Ag that can be purchased using real money (total purchase amount).

In the above non-limiting example, when the total number of purchased apples Ag or the total amount of payment for purchased apples Ag as non-limiting example purchase information has reached a threshold, the number of harvestable apples Ag that are subsequently acquired increases. Alternatively, when another item of purchase information has reached at least one threshold, the number of harvestable apples Ag may increase. In a first non-limiting example, the number of harvestable apples Ag that are subsequently acquired may be increased according to the total number of purchased other virtual items different from apples Ag (e.g., other in-game money having a higher value that is equivalent to a predetermined number of apples Ag, or a virtual item used for a purpose different from that of in-game money). In a second non-limiting example, the number of harvestable apples Ag that are subsequently acquired may be increased according to a purchase period of purchased apples Ag (e.g., the length of a period of time during which apples Ag are purchased, the length of a period of time during which the right to use apples Ag is given, the length of a period of time from the first purchase of apples Ag to the most recent purchase, etc.), the frequency of purchase (e.g., the length of a period of time from the first purchase of apples Ag to the next purchase, the number of times apples Ag are purchased during a predetermined period of time, etc.), or the number of times of purchase. In a third non-limiting example, the number of harvestable apples Ag that are subsequently acquired may be increased according to the purchase timing of purchased apples Ag (e.g., purchase during a specific period of time, such as a promotional campaign period or the like).

As shown in FIG. 4, when the player object Po is present near the tree Ta, then if an operation of harvesting apples Ag on the tree Ta is performed, an event occurs in which the companion object Ho, who is in charge of harvesting work in the virtual world, talks to the player object Po. In this event, the user is advised on how apples Ag should be purchased, i.e., what kind of purchase should be made in order to grow the tree Ta to the next higher growth level. An advice that is given to a user in the event may be hereinafter referred to as a "growth advice notification."

For example, FIG. 4 shows a non-limiting example of the above growth advice notification, indicating that the companion object Ho says to the player object Po "If you purchase an additional 100 apples, it will become a large tree." Such an advice allows the user to recognize that the user should purchase 100 apples Ag in order to grow the tree Ta to the next level and thereby increase the number of harvestable apples Ag that are regularly acquired. This event occurs in response to an operation for harvesting apples Ag, and therefore, the advice is given with a suitable timing to a user who desires to acquire apples Ag, and a user who desires apples Ag is unavoidably notified of the advice.

As shown in FIG. 6, when the harvesting of apples Ag on the tree Ta is finished, an event occurs in which the companion object Ho, who is in charge of the above harvesting work, tells the player object Po a timing at which the next harvest will come. An advice that is given to a user in this event may be hereinafter referred to as a "harvest advice notification."

For example, FIG. 6 shows a non-limiting example of the above harvest advice notification, indicating that the companion object Ho says to the player object Po "The next harvest will come 12 hours later." Such an advice allows a user to recognize when the next harvest of apples Ag, which can be regularly harvested, will come. This event may occur immediately after harvesting of apples Ag. In this case, the advice is given with a suitable timing to a user who desires to acquire more apples Ag, and a user who desires apples Ag is notified of the advice at each harvest time.

As shown in FIG. 7, when there are not harvestable apples Ag on the tree Ta, unripe apples Ai are displayed, on the tree Ta, in a display form that is different from that of ripe and harvestable apples Ag. For example, unripe apples Ai are displayed, on the tree Ta, in a color, size, or shape different from that of ripe apples Ag, which indicates that the apples Ai are not yet harvestable.

When such unharvestable apples Ai are being displayed, then if the player object Po tries to harvest the apples Ai from the tree Ta, a harvest advice notification is given to the user. For example, if a harvesting operation is performed when unripe apples Ai are being displayed, an event occurs in which the companion object Ho, which is in charge of the above harvesting work, notifies the user that it is not a harvest time, and tells the player object Po a timing at which the next harvest will come. For example, in the non-limiting example of FIG. 7, the companion object Ho gives a harvest advice notification to the player object Po by saying "It is not yet a harvest time. The next harvest will come two hours later." Such an advice allows a user to know that apples Ag are not always harvestable, and recognize a timing at which apples Ag can be next harvested.

Figure 8:
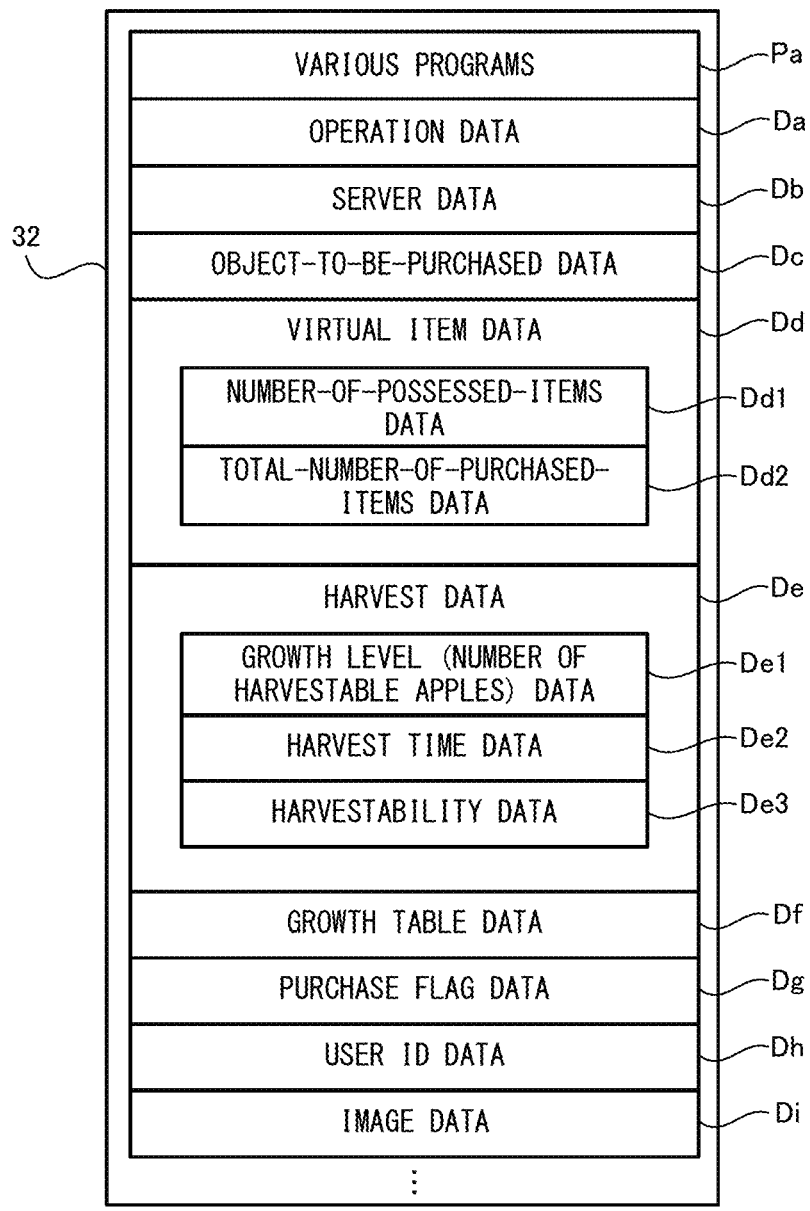
FIG. 8 shows non-limiting example main data and programs stored in a storage unit 32 of the information processing apparatus 3.

Next, processes performed in the information processing system 1 will be described in detail. Firstly, main data used in processes in the information processing apparatus 3 will be described with reference to FIG. 8. FIG. 8 is a diagram showing non-limiting example main data and programs stored in the storage unit 32 of the information processing apparatus 3.

As shown in FIG. 8, in a data storage area of the storage unit 32, stored are operation data Da, server data Db, object-to-be-purchased data Dc, virtual item data Dd, harvest data De, growth table data Df, purchase flag data Dg, user ID data Dh, and image data Di, etc. It should be noted that the storage unit 32 stores, in addition to data contained in the information shown in FIG. 8, data used for processes, such as data for use in executed applications, etc. The storage unit 32 also stores various programs Pa included in information processing programs in a program storage area.

The operation data Da indicates operation information about a user's operation on the information processing apparatus 3. For example, operation data indicating an operation performed on an operation button, etc., is fetched at time intervals that are a unit process time (e.g., 1/60 sec) of the information processing apparatus 3, and the operation data Da is updated with the fetched operation data.

The server data Db indicates details of purchase made by the user with respect to the server 200. The server data Db is obtained from the server 200 in response to the user's operation of purchasing a virtual item, as appropriate.

The object-to-be-purchased data Dc indicates an object that can be purchased using real money, of various virtual items and parameters that are used in the virtual world.

The virtual item data Dd indicates a situation in which the player object Po possesses apples Ag, which are a non-limiting example virtual item that is used in the virtual world. The virtual item data Dd includes number-of-possessed-items data Dd1 and total-number-of-purchased-items data Dd2, etc. The number-of-possessed-items data Dd1 indicates the number of apples Ag possessed by the player object Po. The total-number-of-purchased-items data Dd2 indicates the total number of apples Ag that have been purchased by the user.

The harvest data De is related to harvesting of apples Ag. The harvest data De includes growth level data De1, harvest time data De2, and harvestability data De3, etc. The growth level data De1 indicates the growth level of the tree Ta that grows apples Ag (the number of harvestable apples Ag). The harvest time data De2 indicates a time at which apples Ag can be harvested from the tree Ta. The harvestability data De3 indicates whether or not apples Ag can be harvested from the tree Ta.

The growth table data Df indicates the number of harvested apples Ag, the total purchase amount of apples A, and the total number of purchased apples A, etc., corresponding to each growth level of the tree Ta.

The purchase flag data Dg indicates a purchase flag that is set to 'on' when a process of purchasing apples Ag is being performed.

The user ID data Dh indicates a unique code (user ID) that can be used to identify the user. The code is used when purchase is made using the information processing apparatus 3. For example, the user ID data Dh indicates an account ID that is a character string serving as a label for user identification.

The image data Di is used to generate a game image containing a virtual object, characters, and a background, etc., which is displayed on the display unit 35.

Figure 9:
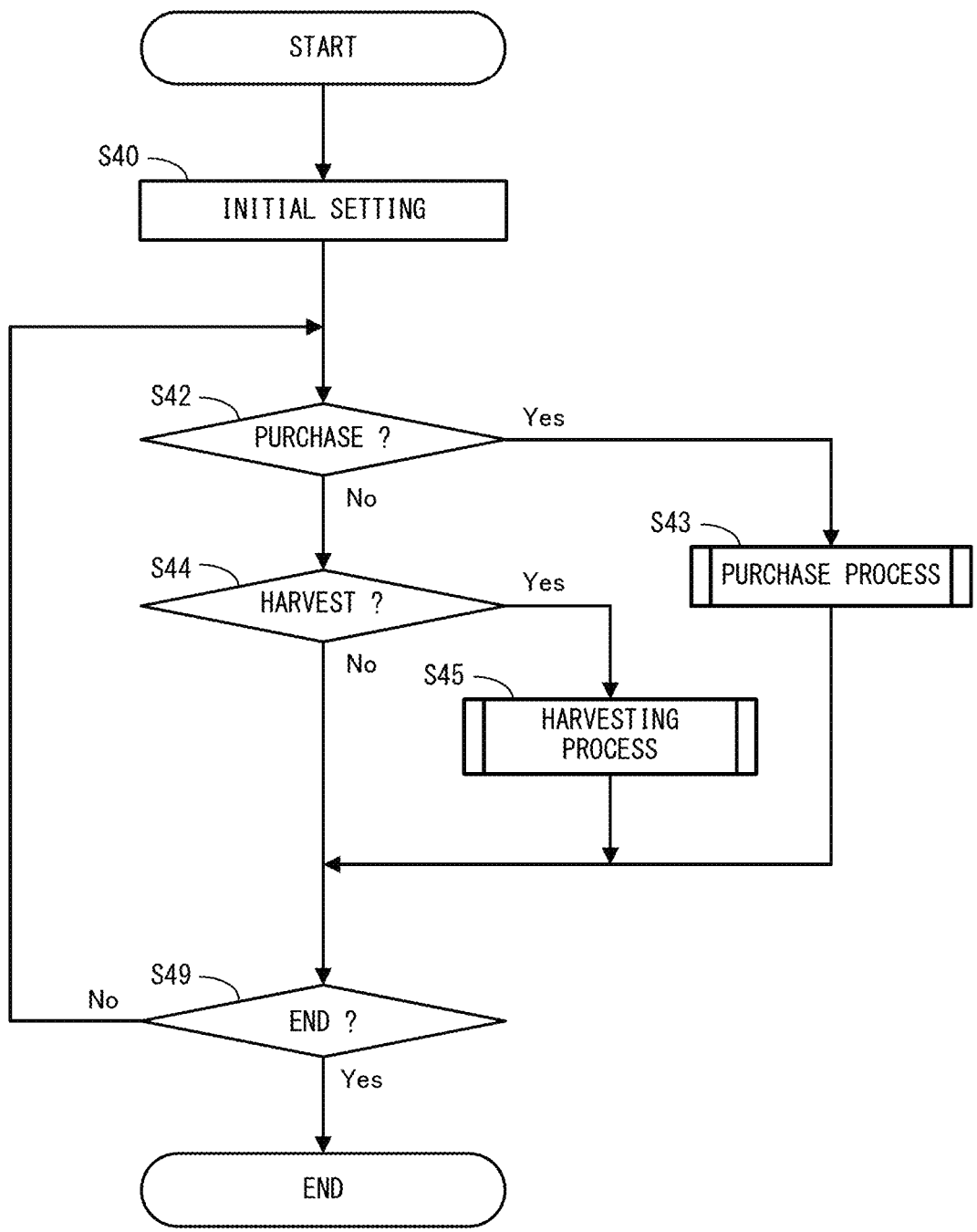
FIG. 9 shows a non-limiting example flowchart of a non-limiting example process executed by the information processing apparatus 3.
Figure 10:
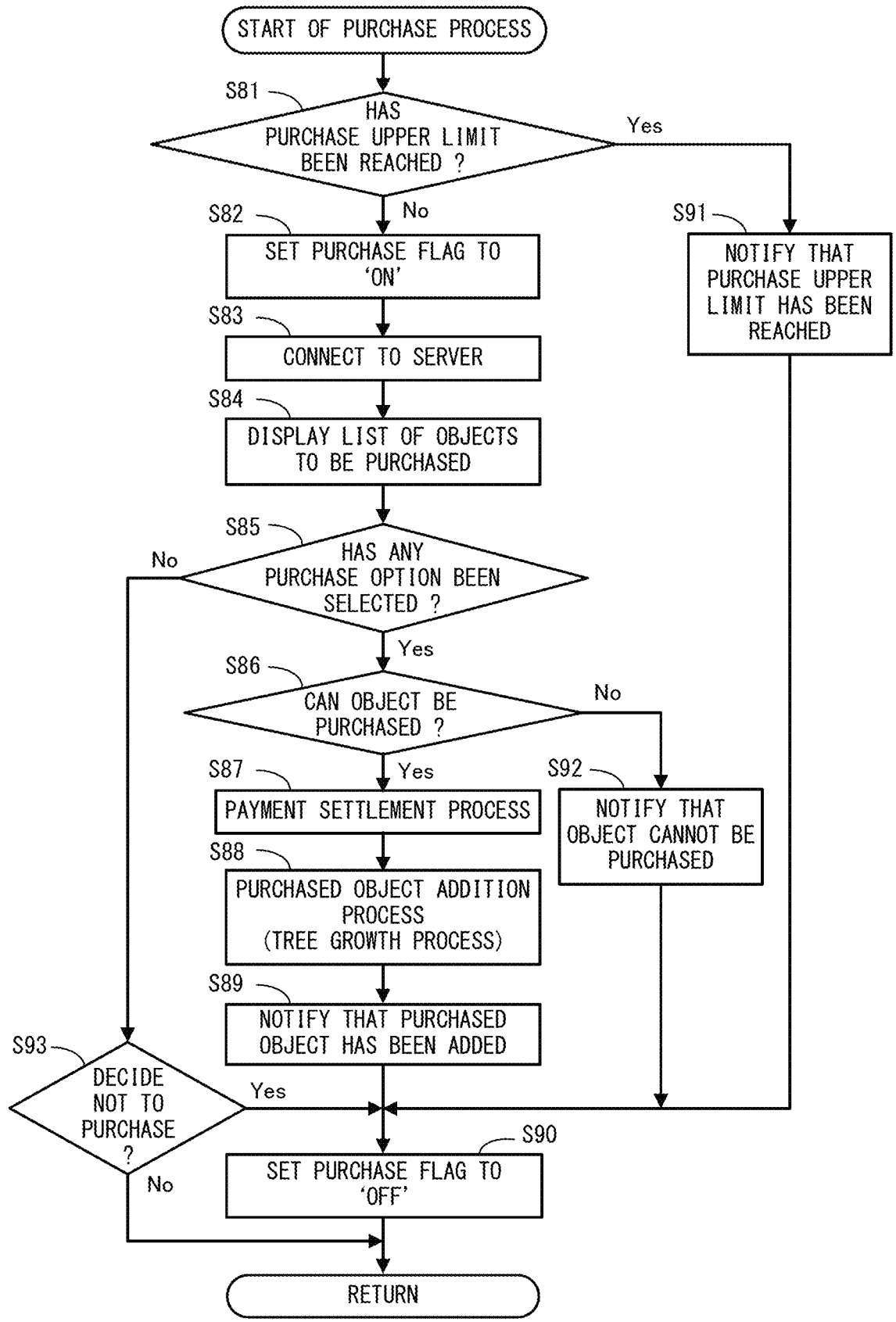
FIG. 10 shows, in detail, a non-limiting example subroutine in which a purchase process is executed in step S43 shown in FIG. 9.
Figure 11:
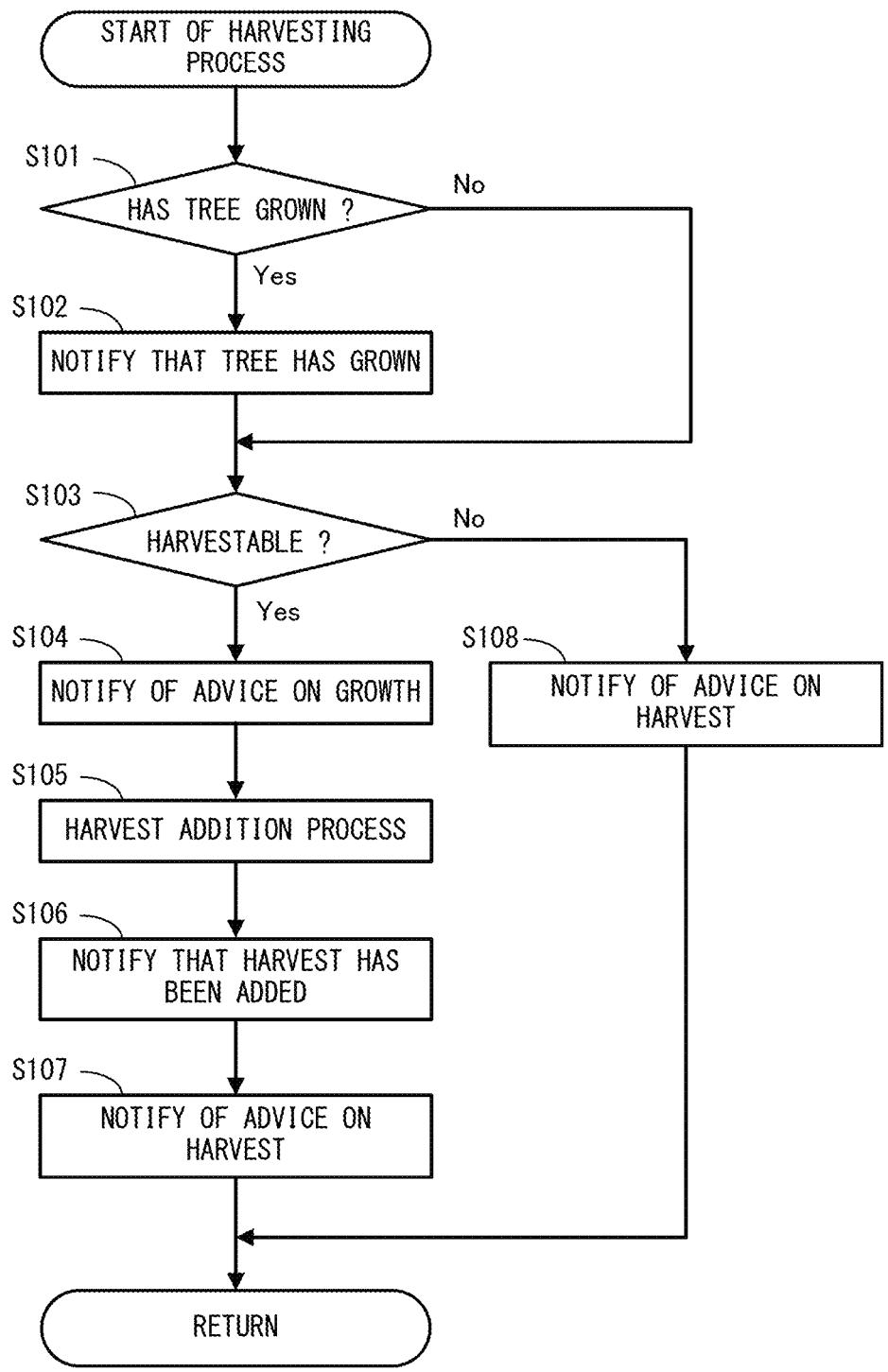
FIG. 11 shows, in detail, a non-limiting example subroutine in which a harvesting process is executed in step 45 shown in FIG. 9.

Next, processes performed in the information processing apparatus 3 will be described in detail with reference to FIGS. 9-11. FIG. 9 is a flowchart showing a non-limiting example process executed by the information processing apparatus 3. FIG. 10 shows, in detail, a non-limiting example subroutine in which a purchase process is executed in step S43 shown in FIG. 9. FIG. 11 shows, in detail, a non-limiting example subroutine in which a harvesting process is executed in step 45 shown in FIG. 9. Here, of the processes in the information processing system 1 shown in the flowcharts of FIGS. 9-11, processes of acquiring apples Ag, which are a non-limiting example virtual item used in the virtual world, are mainly described, and the other processes that are not directly involved with those processes are not described in detail. In FIGS. 9-11, the term "step" which is executed by the control unit 31 is abbreviated to "S."

It should be noted that the steps in the flowcharts of FIGS. 9-11 are merely for illustrative purposes. Some or all of the steps may be performed in other orders, and other steps may be added or substituted, provided that similar effects are obtained. Although, in this non-limiting example, it is assumed that the steps in the above flowcharts are executed by the control unit 31 (CPU), a portion of the steps of the flowcharts may be executed by a processor other than the control unit 31 (CPU), or a dedicated circuit. Alternatively, all the steps of the flowcharts may be executed by a processor other than the control unit 31 (CPU), or a dedicated circuit.

In the flowcharts of FIGS. 9-11, the order of processes for describing the order of events in which apples Ag are acquired is mainly described, and processes that are performed at time intervals that are the unit process time of the information processing apparatus 3 are not described. For example, a process of obtaining operation data from the input unit 34 and updating the operation data Da (an operation data obtaining process), a process of updating the virtual world in which the tree Ta is provided, and displaying the virtual world on the display unit 35 (a harvestability setting process and a display control process), and other processes that are different from events in which apples Ag are acquired, etc., are not shown in the flowcharts of FIGS. 9-11.

Here, in the above operation data obtaining process, the control unit 31 obtains operation data from the input unit 34, and updates the operation data Da, at time intervals that are the unit process time of the information processing apparatus 3.

In the above harvestability setting process, the control unit 31 decides whether or not the tree Ta can be harvested, at time intervals that are the unit process time of the information processing apparatus 3. For example, in the above harvestability setting process, the control unit 31 obtains a time at which apples Ag will next become harvestable, by referring to the harvest time data De2. The control unit 31 changes the tree Ta from an unharvestable state to a harvestable state, and updates the harvestability data De3, in each time interval if the time interval falls within a harvest time.

The above other processes performed by the control unit 31 include, for example, a process of operating the player object Po in the virtual world according to the operation data Da, or operating another object based on a predetermined algorithm, at time intervals that are the unit process time of the information processing apparatus 3.

In the above display control process, the control unit 31 displays the virtual world on the display unit 35 at time intervals that are the unit process time of the information processing apparatus 3. For example, the control unit 31 performs a process of constructing the virtual world, and displaying an image of the virtual world on the display unit 35, based on parameters for performing an information process (game process) (e.g., data indicating positions and orientations of the player object Po and other objects, data indicating a position and an orientation of a virtual camera, etc.). The control unit 31 also performs a process of generating an image of the virtual world corresponding to a process result of each step described below, or generating an image corresponding to the process result, and displaying the image on the display unit 35. When the harvestability data De3 indicates a harvestable state, the control unit 31 also generates an image of the virtual world in which the tree Ta having apples Ag at a growth level indicated by the growth level data De1 is placed in the virtual world. When the harvestability data De3 indicates an unharvestable state, the control unit 31 generates an image of the virtual world in which the tree Ta having apples Ai that cannot be harvested at a growth level indicated by the growth level data De1 (see FIG. 7) is placed in the virtual world. It should be noted that an image of the virtual world may be generated in which the tree Ta having no grown apples (see FIG. 6) immediately after harvesting of apples Ag from the tree Ta (within a predetermined period of time after harvesting) is placed in the virtual world.

When the steps in the flowcharts of FIGS. 9-11 are executed, the control unit 31 (CPU) initializes a memory, etc., in the storage unit 32, and reads an information processing program from the program storage unit 33 into the memory. Thereafter, the CPU starts executing the information processing program. The flowcharts of FIGS. 9-11 show processes that are performed after completion of the above process.

In FIG. 9, the control unit 31 sets initial settings (step S40), and control proceeds to the next step. For example, in step S40, the control unit 31 initially sets parameters for the following information process (game process). In step S40, the control unit 31 also constructs a virtual world in which a game is performed, and arranges the player object Po, the tree Ta, the companion object Ho, etc., in the virtual world in respective predetermined states and at respective predetermined positions. In step S40, the control unit 31 also sets the user ID of a user who is operating the information processing apparatus 3, and updates the user ID data Dh, if necessary.

Next, the control unit 31 determines whether or not to perform a process of purchasing apples Ag, which are non-limiting example in-game money (step S42). For example, the control unit 31 determines to perform the process of purchasing apples Ag, by referring to the operation data Da, if the user has performed an operation for purchasing apples Ag using the input unit 34, or the purchase flag indicated by the purchase flag data Dg is 'on.' Thereafter, if the control unit 31 has determined to perform the purchase process, control proceeds to step S43. Otherwise, i.e., if the control unit 31 has determined not to perform the purchase process, control proceeds to step S44.

In step S43, the control unit 31 performs the process of purchasing apples Ag, and control proceeds to step S49. The process of purchasing apples Ag performed in step S43 will now be described with reference to FIG. 10.

In FIG. 10, the control unit 31 determines whether or not the total number of purchased apples A has reached the upper limit of the number of apples A that can be purchased (step S81). For example, the control unit 31 obtains the total number of apples A that have been so far purchased by the user, by referring to the total-number-of-purchased-items data Dd2. Thereafter, if the total number of purchased apples A of the user has not reached the upper limit of applies Ag that can be purchased (e.g., the total number of purchased apples A at the highest growth level indicated by the growth table data Df; in the non-limiting example of FIG. 5, 2950 apples Ag), the result of the determination by the control unit 31 in step S81 is negative, and control proceeds to step S82. Otherwise, i.e., if the total number of purchased apples A of the user has reached the upper limit of applies Ag that can be purchased, the result of the determination by the control unit 31 in step S81 is positive, and control proceeds to step S91.

In step S82, the control unit 31 sets the purchase flag to 'on,' and control proceeds to the next step. For example, if the purchase flag is off, the control unit 31 sets the purchase flag to 'on,' and updates the purchase flag data Dg.

Next, the control unit 31 connects to the server 200, and starts data communication with the server 200 (step S83), and control proceeds to the next step. For example, the control unit 31 obtains the purchase-related information of the user from the server 200, and updates the server data Db. As a non-limiting example, the purchase-related information contains various items of information that are used when the user additionally purchases a virtual item, such as details of purchase made by the user for the game, the balance of cash or the balance of points after the user's payment, and the like, Next, the control unit 31 displays a list of objects to be purchased on the display unit 35 (step S84), and control proceeds to the next step. For example, the control unit 31 shows virtual item options that can be purchased by the user, by generating a list of objects to be purchased and displaying the list on the display unit 35. Specifically, the list includes the type, amount, and price (point value) of each virtual item that can be purchased by the user in the game. For example, when apples Ag are among the virtual items that can be purchased, the purchase amount (the number of points for payment for purchase) corresponding to the number of apples Ag to be purchased is displayed on the display unit 35. It should be noted that, in step S84, when the list of objects to be purchased is displayed on the display unit 35, a growth advice notification may be displayed on the display unit 35. Thus, when a user considers purchasing a virtual item, then if the user is given an advice for growing the tree Ta to the next growth level, the user can decide whether or not to purchase the virtual item, taking into consideration the number of apples Ag that are regularly acquired after purchase.

Next, the control unit 31 determines whether or not the user has decided to make purchase (step S85). For example, if the control unit 31 has determined, by referring to the operation data Da, that the user has performed an operation of deciding to purchase apples Ag using the input unit 34, control proceeds to step S86. Otherwise, i.e., if the control unit 31 has determined that the user has not performed an operation of deciding to purchase apples Ag, control proceeds to step S93.

In step S86, the control unit 31 determines whether or not the apples Ag that the user has decided to purchase can be purchased. For example, if the control unit 31 has determined, by referring to the server data Db, that the balance of cash or the balance of points is enough for the user to purchase the apples Ag that the user has decided to purchase, the result of the determination in step S86 is positive. If the control unit 31 has determined that the apples Ag that the user has decided to purchase can be purchased, control proceeds to step S87. Otherwise, i.e., if the control unit 31 has determined that the apples Ag that the user has decided to purchase cannot be purchased, control proceeds to step S92.

In step S87, the control unit 31 settles payment for the apples Ag that the user has decided to purchase, and control proceeds to the next step. For example, the control unit 31 sends the number of the apples Ag that the user has decided to purchase, the amount of payment for the purchase (the number of points for payment for the purchase), etc., to the server 200, and receives data indicating permission for the purchase from the server 200, so that a payment settlement process is completed.

Next, the control unit 31 performs a process of adding the purchased object (step S88), and control proceeds to the next step. For example, the control unit 31 adds the number of purchased apples Ag settled in step S87 to the number of possessed apples Ag indicated by the number-of-possessed-items data Dd1, and updates the number-of-possessed-items data Dd1 with the number of apples Ag obtained by the addition, i.e., the number of possessed apples Ag. The control unit 31 also adds the number of purchased apples Ag settled in step S87 to the total number of purchased apples A indicated by the total-number-of-purchased-items data Dd2, and updates the total-number-of-purchased-items data Dd2 with the number of apples Ag obtained by the addition, i.e., the total number of purchased apples A. The control unit 31 also determines, by referring to the growth table data Df, whether or not the newly calculated total number of purchased apples A is a value that can grow the tree Ta to the next growth level. If the result of the determination is positive, the control unit 31 updates the growth level data De1 with the new growth level.

It should be noted that if, in step S88, the total number of purchased apples A has reached a value that is a threshold for growing the tree Ta to the next growth level, a growth notification which notifies the user that the tree Ta has grown to the next level may be displayed on the display unit 35. Thus, when a virtual item has been purchased, the user is notified that the tree Ta grows to the next growth level, so that the user can realize that the number of applies Ag that can be regularly given is increased due to the purchase. If, in step S88, the growth level data De1 has been updated with the next growth level of the tree Ta, harvestable apples Ag may be provided on the tree Ta. In this case, if the total number of purchased apples A has reached a value that is a threshold for growing the tree Ta to the next growth level, the control unit 31 updates the harvestability data De3 so that the harvestability data De3 indicates a harvestable state.

Next, the control unit 31 notifies the user that a purchased item has been added by the purchase (step S89), and control proceeds to the next step. For example, when 100 apples Ag have been purchased by the purchase process, the control unit 31 displays, on the display unit 35, a notification indicating that the number of apples Ag possessed by the player object Po has increased by 100.

Next, the control unit 31 sets the purchase flag to 'off' (step S90), and ends the subroutine process. For example, the control unit 31 sets the purchase flag indicated by the purchase flag data Dg to 'off,' and updates the purchase flag data Dg.

Meanwhile, if, in step S86, the control unit 31 has determined that the apples Ag that the user has decided to purchase cannot be purchased, the control unit 31 notifies the user that the apples Ag that the user has decided to purchase cannot be purchased (step S92), and control proceeds step S90. For example, the control unit 31 displays, on the display unit 35, a notification indicating that the apples Ag that the user has decided to purchase cannot be purchased, and its reason (e.g., the balance of cash or the balance of points is not sufficient, etc.). It should be noted that, if, in step S92, the user has overcome the reason why the apples Ag that the user has decided to purchase cannot be purchased (e.g., the user has accessed the server 200 to increase the balance of cash or the balance of points), control may proceed to step S87, in which a payment settlement process for purchase of apples Ag may be performed.

If, in step S85, the control unit 31 has determined that the user has not performed an operation of deciding to purchase apples Ag, the control unit 31 determines whether or not the user has decided not to purchase apples Ag (step S93). For example, if the control unit 31 has determined, by referring to the operation data Da, that the user has performed an operation of deciding not to purchase apples Ag, using the input unit 34, control proceeds to step S90. Otherwise, i.e., if the control unit 31 has determined that the user has not performed an operation of deciding not to purchase apples Ag, the subroutine process is directly ended.

If, in step S81, the control unit 31 has determined that the total number of purchased apples A has reached the upper limit of applies Ag that can be purchased, the control unit 31 notifies the user that the total number of purchased apples A has reached the upper limit of applies Ag that can be purchased (step S91), and control proceeds to step S90. For example, the control unit 31 displays, on the display unit 35, a notification indicating that the tree Ta has already grown to the highest growth level, and therefore, no more apples Ag can be purchased (e.g., a notification indicating that apples Ag have been sold out).

Referring back to FIG. 9, if, in step S42, the control unit 31 has determined not to perform a process of purchasing apples Ag, the control unit 31 determines whether or not to perform a process of harvesting apples Ag (step S44). For example, the result of the determination in step S44 is positive if the control unit 31 has determined, by referring to the operation data Da, that the user has performed an operation of harvesting apples Ag, using the input unit 34. If the control unit 31 has determined to perform a harvesting process, control proceeds to step S45. Otherwise, i.e., if the control unit 31 has determined not to perform a harvesting process, control proceeds to step S49.

In step S45, the control unit 31 performs a process of harvesting apples Ag, and control proceeds to step S48. The process of harvesting apples Ag performed in step S45 will now be described with reference to FIG. 11.

In FIG. 11, the control unit 31 determines whether or not the tree Ta has grown since the previous harvest (step S101). For example, if the growth level indicated by the growth level data De1 has been updated with a new growth level since the previous harvesting process, the control unit 31 determines that the tree Ta has grown since the previous harvest. If the control unit 31 has determined that the tree Ta has grown since the previous harvest, control proceeds to step S102. Otherwise, i.e., if the control unit 31 has determined that the tree Ta has not grown since the previous harvest, control proceeds to step S103.

In step S102, the control unit 31 notifies the user that the tree Ta has grown to the next growth level, and control proceeds to step S103. For example, the control unit 31 displays, on the display unit 35, an event in which the companion object Ho gives the player object Po a growth notification indicating that the tree Ta has grown to the next growth level due to the purchase of apples Ag.

In step S103, the control unit 31 determines whether or not the tree Ta has harvestable apples Ag. For example, the control unit 31 determines whether or not the tree Ta is in the harvestable state, by referring to the harvestability data De3. If the control unit 31 has determined that the tree Ta has harvestable apple Ag, control proceeds to step S104. Otherwise, i.e., if the control unit 31 has determined that the tree Ta does not have harvestable apple Ag, control proceeds to step S108.

In step S104, the control unit 31 gives a growth advice notification, and control proceeds to the next step. For example, the control unit 31 displays, on the display unit 35, an event in which the companion object Ho advises the player object Po about how apples Ag are purchased in order to grow the tree Ta to the next growth level (growth advice notification; see FIG. 4).

Next, the control unit 31 performs a process of adding harvested items (step S105), and control proceeds to the next step. For example, the control unit 31 adds the number of apples Ag on the tree Ta (i.e., the number of harvested apples A corresponding to a growth level of the tree Ta indicated by the growth table data Df) to the number of possessed apples Ag indicated by the number-of-possessed-items data Dd1, and thereafter, updates the number-of-possessed-items data Dd1 with the number of apples Ag obtained by the addition, i.e., the number of possessed apples Ag. The control unit 31 also updates the harvestability data De3 so that the harvestability data De3 indicates an unharvestable state, and displays, on the display unit 35, the tree Ta that has been changed to the unharvestable state in the virtual world. The control unit 31 also sets a time at which apples Ag will next become harvestable, and updates the harvest time data De2 with that time.

Next, the control unit 31 notifies the user that a harvested object has been added by harvesting (step S106), and control proceeds to the next step. For example, when 20 apples Ag have been harvested by the harvesting process, the control unit 31 displays, on the display unit 35, a notification indicating that the number of apples Ag possessed by the player object Po has increased by 20.

Next, the control unit 31 gives a harvest advice notification (step S107), and ends the subroutine process. For example, the control unit 31 displays, on the display unit 35, an event in which the companion object Ho tells the player object Po a timing at which apples Ag will next become harvestable (harvest advice notification; see FIG. 6).

Meanwhile, if, in step S103, the control unit 31 has determined that apples Ag cannot be harvested from the tree Ta, the control unit 31 gives a harvest advice notification (step S108), and ends the subroutine process. For example, the control unit 31 displays, on the display unit 35, an event in which the companion object Ho tells the player object Po a timing at which apples Ag will next become harvestable (harvest advice notification; see FIG. 7).

Referring back to FIG. 9, if, in step S44, the control unit 31 has determined not to perform a process of harvesting apples Ag, the control unit 31 determines whether or not to end the information process (game process). The information process is ended, for example, under the following condition: a condition for ending the information process is satisfied; the user has performed an operation of ending the information process; etc. If the control unit 31 has determined not to end the information process, control returns to step S42, in which the process is repeated. If the control unit 31 has determined to end the information process, the process of the flowchart ends.

Thus, according to the processes of the information processing apparatus 3 and the server 200 in the information processing system 1, when a user has purchased apples Ag, which are non-limiting example in-game money, the number of harvested apples A that can be regularly harvested free of charge increases, and therefore, the user's purchase can be either encouraged or restrained. Meanwhile, the number of purchased apples Ag, which are non-limiting example in-game money, and the number of harvested apples A that can be regularly harvested free of charge, are limited, and the maximum number of harvested apples A is set to a value that is sufficient to allow a user to play the game, and therefore, the purchase amount can be restrained.

It should be noted that, in the above process performed in the information processing apparatus 3, the user may be requested to perform an operation before or after each event occurs. For example, when a predetermined operation is required so that the next event occurs, the process flow may be adapted so that the next event or process is performed after the user performs a predetermined operation before or after each event (e.g., an event in which a notification is given to the user, etc.). The above process may be executed by either the information processing apparatus 3 or the server 200. At least a portion of the processes of FIGS. 9-11 and the processes performed at time intervals that are the unit process time of the information processing apparatus 3 may be executed by the server 200.

In the above non-limiting example, in a game that is played in a virtual world, a rule by which in-game money is given, such as the amount of in-game money that is given free of charge, the intervals at which in-game money is given, etc., is changed in response to purchase of in-game money. Alternatively, a rule by which another reward is given in a game may be changed. As a non-limiting example, in a game that is played in a virtual world, a rule by which a virtual item other than in-game money is given, such as the amount of the virtual item that is given free of charge, the intervals at which the virtual item is given, etc., may be changed in response to purchase of in-game money. As another non-limiting example, in a game that is played in a virtual world, a rule by which another reward (e.g., a parameter that improves an ability of a player object, etc.) is given, such as the amount of the reward that is given free of charge (e.g., a parameter value given according to a fight with an opponent or the number of times the game is played, etc.), the intervals at which the reward is given (e.g., the intervals at which a parameter is regularly increased, etc.), etc., may be changed in response to purchase of the reward in the game.

When an online shopping application, etc., is used instead of the above game application, this non-limiting example may be applied to a user reward or a user bonus that is given free of charge. For example, a user may purchase a commercial product, service, etc. (e.g., do the shopping to purchase an actual commercial product or service, etc.) through the information processing apparatus 3 and the server 200. Irrespective of the presence or absence of purchase of the commercial product or service, an electronic coupon (e.g., a gift voucher, a discount coupon, etc.) for use in purchase of the commercial product or service, etc., in a shopping application may be regularly given to a user free of charge. In such an arrangement, a rule by which the gift voucher, discount coupon, etc., is given to a user may be changed in response to purchase of the commercial product or service, etc. Specifically, in the above arrangement, the number of the gift vouchers or discount coupons that are regularly given free of charge, the intervals at which the gift voucher or discount coupon is given, the amount of a bonus, a commercial product or service to be offered, etc., may be changed according to purchase information about a user's purchase of the commercial product or service, etc. Even in such an arrangement, when a user has purchased the commercial product or service, etc., a rule by which the gift voucher or discount coupon that can be used for the purchase is given free of charge is changed, and therefore, the user's purchase can be either encouraged or restrained.

In the foregoing non-limiting example, the information process is performed in the information processing apparatus 3 and the server 200. Alternatively, at least a portion of the steps in the information process may be performed in another apparatus. For example, when the information processing apparatus 3 is also connected to and can communicate with another apparatus (e.g., another server, another game apparatus, another mobile terminal, etc.), the steps in the information process may be executed in cooperation with the other apparatus. Alternatively, a portion of the process performed in the server 200 may be performed in the information processing apparatus 3 or another apparatus. Thus, a process similar to the above information process can be performed by another apparatus performing a portion of the steps of the information process. The above information process may be executed by a single processor or a plurality of cooperating processors included in an information processing system including at least one information processing apparatus and a server. In the above non-limiting example, the process shown in the flowchart is performed by the control unit 31 of the information processing apparatus 3 or the control unit 202 of the server 200 executing a predetermined program. Alternatively, all or a portion of the above process may be performed by a dedicated circuit included in the information processing apparatus 3 or a dedicated circuit included in the server 200.

Here, according to the above non-limiting variation, this non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and this non-limiting example may be implemented by assigning the steps to the apparatuses in substantially any manner.

The order of steps, setting values, conditions for determination, etc., used in the above information process are merely for illustrative purposes, and other order of steps, setting values, conditions for determination, etc., may be used to implement this non-limiting example.

The above information processing program (e.g., a game program) may be supplied to the information processing apparatus 3 or the server 200 not only through an external storage medium, such as an external memory or the like, but also through a wired or wireless communication line. The program may be previously stored in a non-volatile storage device in the information processing apparatus 3 or the server 200. Examples of an information storage medium storing the program may include non-volatile memories, and in addition, CD-ROMs, DVDs, optical disc-like storage media similar thereto, and flexible disks, hard disks, magneto-optical disks, magnetic tapes, and the like. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertain. If there is any inconsistency or conflict, the present specification (including the definitions) shall prevail.

This non-limiting example is useful for information processing systems and information processing programs, etc., in order to either encourage or restrain a user's purchase.

What is claimed is:

1. An information processing system for performing a predetermined information process for a video game that is played according to operations performed by a user, the information processing system comprising:
at least one computer configured to:
provide a first virtual item to the user in response to a virtual item transaction that involves the user, the first virtual item usable within the video game,
irrespective of virtual item transactions associated with the video game, repeatedly provide a second virtual item to the user free of charge according to a provision rule, the second virtual item usable within the video game, and
in response to a second virtual item transaction that involves the user and a determination that transaction information related to the first virtual item satisfies at least one condition, change the provision rule according to the transaction information related to the first virtual item, wherein the provision rule is changed multiple different times,
wherein the first virtual item is the same as the second virtual item.

2. The information processing system according to claim 1, wherein
the first virtual item and the second virtual item are respectively any of virtual money, an in-game item, a virtual object, and an electronic coupon.

3. The information processing system according to claim 1, wherein
the transaction information is related to at least one of a type, amount, frequency, time period, number of times obtained, and a time that the first virtual item is provided.

4. The information processing system according to claim 1, wherein
the transaction information is related to at least one of an amount, frequency, time period, and a number of times that the first virtual item is provided, and
the at least one computer is configured to
in changing the provision rule, change the provision rule provided that the transaction information reaches at least one threshold.

5. The information processing system according to claim 4, wherein
the at least one computer is configured to
in changing the provision rule, unless the transaction information reaches a new threshold, maintain the provision rule currently set without setting back to the previous provision rule, and change the provision rule currently set provided that the transaction information reaches the new threshold.

6. The information processing system according to claim 1, wherein
the provision rule is a combination of a condition for providing the second virtual item to the user, and an amount, value, or type of the second virtual item provided to the user, and
the at least one computer is configured to
in changing the provision rule, set the provision rule provided that at least one of the condition, the amount, the value, and the type is changed according to the transaction information.

7. The information processing system according to claim 1, wherein
the at least one computer is configured to
in providing the second virtual item, provide the user with the second virtual item in an unusable mode insofar as a condition for providing the second virtual item to the user is unsatisfied, and change the second virtual item into a usable mode provided that the condition is satisfied after the provision.

8. The information processing system according to claim 1, wherein
the information processing system includes a server, and a client apparatus configured to connect to the server,
the server includes at least a computer configured to set the transaction information according to the user's transaction operation, and
the client apparatus includes at least a computer configured to provide the second virtual item.

9. The information processing system according to claim 1, wherein
the at least one computer is configured to
notify the user of a transaction requirement related to provision of the first virtual item, the transaction requirement being used to change the provision rule.

10. The information processing system according to claim 9, wherein
the at least one computer is configured to
in providing the second virtual item, provide the second virtual item to the user provided that a predetermined operation is performed, and
in notifying, notify the user of the transaction requirement provided that the operation is performed.

11. The information processing system according to claim 1, wherein the at least one computer is configured to:
in changing the provision rule, change and set the provision rule to increase an amount of the second virtual item provided to the user by a first amount, wherein the first amount is greater than a second amount for a previous increase.

12. The information processing system according to claim 11, wherein
the at least one computer is configured to
in providing the first virtual item, set an upper limit.

13. A non-transitory computer-readable storage medium having stored therein an information processing program executable by a computer included in an information processing apparatus configured to perform a predetermined information process for a video game that is played according to a user's operation, the program causing the computer to execute:
providing a first virtual item to the user in response to a virtual item transaction performed by the user, the first virtual item usable within the video game,
both in a case where the first virtual item is provided via the virtual item transaction and a case where the first virtual item is not provided via the virtual item transaction, repeatedly providing a second virtual item to the user free of charge according to a provision rule, the second virtual item usable within the video game, and
in response to the virtual item transaction and a determination that transaction information related to the first virtual item satisfies at least one condition, changing the provision rule according to transaction information related to the first virtual item, wherein the provision rule is changed multiple different times,
wherein the first virtual item is the same as the second virtual item.

14. The information processing system of claim 1, wherein each time the provision rule is changed includes a change in an amount of the second virtual item that is provided to the user free of charge.

15. The information processing system of claim 1, wherein how the provision rule is changed is based on which one of a plurality of different conditions is satisfied.

* * * * *